Feb. 20, 1968 J. MARLEY 3,370,202

COMPONENT ARRANGEMENT HAVING CORRUGATED RINGS FOR APPLYING ELECTRICAL POTENTIAL TO DETACHABLE UNITS

Filed March 19, 1963 2 Sheets-Sheet 1

INVENTOR.
JOHN MARLEY

BY
Thomas J. Kilganon Jr.
AGENT

COMPONENT ARRANGEMENT HAVING CORRUGATED RINGS FOR APPLYING ELECTRICAL POTENTIAL TO DETACHABLE UNITS

Filed March 19, 1963 2 Sheets-Sheet 2

INVENTOR.
JOHN MARLEY
BY
Thomas J. Kilgannon Jr.
AGENT

United States Patent Office 3,370,202

Patented Feb. 20, 1968

3,370,202

COMPONENT ARRANGEMENT HAVING CORRUGATED RINGS FOR APPLYING ELECTRICAL POTENTIAL TO DETACHABLE UNITS

John Marley, Wayne, N.J., assignor to International Telephone and Telegraph Corporation, Nutley, N.J., a corporation of Maryland Filed Mar. 19, 1963, Ser. No. 266,342
5 Claims. (Cl. 317—101)

This invention relates to electrical component packaging arrangements and more particularly to high-density electrical component packaging arrangements which are adapted for quick, low cost replacement in computer equipments and the like.

As present-day electronic equipment becomes more expensive and more complex, many avenues for reducing cost, increasing reliability and generally improving operation of such equipment are being investigated. One successful result of such investigations has been the development of the plug-in-unit concept whereby various electronic subassemblies are packaged and incorporated into a computer, for instance, as a unit. Upon failure of any component, the unit containing the offending component is merely removed and a new unit is inserted thereby minimizing the down-time of highly expensive or critical equipments.

Some prior art arrangements utilize constructions which incorporate standard size electronic components and others incorporate printed circuitry and micro-miniaturization techniques. The former constructions fall into two important categories termed "cordwood" and "disciplined geometry" constructions. In the "cordwood" construction, standard components are arranged with their leads parallel to each other and interconnections are made on printed circuit boards; the conductors of which are positioned at right angles to the component leads. In the "disciplined geometry" arrangements, the components utilized have at least one uniform dimension. Square wafers, for instance, may be stacked and interconnected by vertical risers which run up the edges of the stack. Both of these techniques make extensive use of soldering and welding and the finished unit is often "potted" to protect the unit from its environment. Such units, because of their construction, have a relatively high replacement cost and repair of a failed component is both difficult and expensive.

Printed circuit and micro-miniature devices are coming into wide use, but, these devices are usually connected with like devices and made into units which utilize techniques which, like the "cordwood" and "disciplined geometry" constructions, having a relatively high replacement and repair cost.

In all of the techniques mentioned, the units provided are usually intended to perform a certain function when incorporated into a computer or other similar equipment. Thus, a given unit may perform a certain logic function or it may be a trigger generator which energizes various other units of the apparatus in which the unit is utilized. Because of the wide use of soldering and welding used in the prior art techniques, little can be done to change the function or operation of a plug-in-unit without extensive remodification and rewiring after the unit has been removed from its equipment. Thus, there is little versatility of function available in the prior art units which if it were available, would reduce the cost of equipments in which they are utilized by a considerable amount.

From the foregoing, it is apparent that limitations as to construction, cost, versatility of function, and ability to repair exist in presently available high-density packaging arrangements and that a need exists for an arrangement which incorporates the features of high packing-density, low replacement cost, ease of repair and versatility of function.

It is therefore an object of this invention to provide a high density electrical component packaging arrangement which is superior to prior art packaging arrangements.

Another object is to provide an electrical component packaging arrangement which incorporates both standard and micro-miniaturized electrical components.

A further object is to provide a packaging arrangement which has a high packing density, low replacement cost and is susceptible of easy repair.

A still further object is to provide a packaging arrangement which has a standard configuration and yet is not limited to performing a single function within an equipment.

A still further object is to provide a packaging arrangement having a configuration which is compatible with similar packaging arrangements such that an array of such packages form a complete equipment.

Yet another object is to provide a packaging arrangement having a structure which is amenable to redundancy techniques.

A feature of this invention is the utilization of first and second female members and a male plug-in-unit which is receivable in the female members, all of which structures have a polygonal cross-section and preferably an hexagonal cross-section.

Another feature is the utilization of a plug-in-unit consisting of a skeleton structure, mounting and energy distributing means for a plurality of electrical devices detachably connected to the skeleton structure and means, integral with the skeleton structure, for applying electrical potentials to the electrical devices electrically coupled to the mounting and energy distributing means.

A further feature is the provision of transducer means in the form of "encoder" means or in the form of another plug-in-unit and a female member either of which transducers may be electrically and mechanically connected to an originally present female member to either interconnect the various electrical devices of a packaging arrangement or to provide "redundancy" capabilities for a packaging arrangement.

A still further feature is the utilization of "encoder" means in either the form a number of flexible conductors to "patch" between electrical devices or in the form of a hollow hexagonally shaped insulator having fixed interconnection paths disposed on its surfaces. The latter mentioned arrangement may be inserted into a female member to interconnect various ones of the electrical devices to cause a given electrical function to be performed. By substituting another "encoder" having other fixed interconnections thereon, another electrical function can be provided without dismantling the packaging arrangement or having direct access to the individual electrical devices.

Yet another feature is the utilization of a skeleton structure which has a center post and a number of hexagonally shaped retaining members connected thereto. Each of the sides of the hexagonally shaped members contain recesses into which planar printed circuit boards may be press-fitted. The extremities of the circuit boards when so mounted, in cooperation with conductive signal paths which terminate at the extremities of the boards, act as male portions which are receivable in grouped female receptacles of the female members.

A still further feature is the utilization of a power distribution arrangement, integral with the skeleton structure, to apply electrical potentials to conductive power supply paths which in turn feed the electrical devices mounted on the printed circuit boards. The power distribution arrangement consists of a plurality of conductive members, corrugated rings, for instance, having contact portions arranged one-above-the-other on a grooved insulator. The contact portions make contact with power supply paths on the printed circuit boards to apply power from a plurality of power pins, through feed pins to each of the electrical devices mounted on the circuit boards.

A still further feature is the utilization of "encoder" means in either the form of a number of flexible conductors to "patch" between electrical devices or in the form of a hollow hexagonally shaped insulator having fixed interconnection paths disposed on its surfaces. The latter mentioned arrangement may be inserted into a female member to interconnect various ones of the electrical devices to cause a given electrical function to be performed. By substituting another "encoder" having other fixed interconnections thereon, another electrical function can be provided without dismantling the packaging arrangement or having direct access to the individual eletrical devices.

Yet another feature is the utilization of a skeleton structure which has a center post and a number of hexagonally shaped retaining members connected thereto. Each of the sides of the hexagonally shaped members contain recesses into which planar printed circuit boards may be press-fitted. The extremities of the circuit boards when so mounted, in cooperation with conductive signal paths which terminate at the extremities of the boards, act as male portions which are receivable in grouped female receptacles of the female members.

A still further feature is the utilization of a power distribution arrangement, integral with the skeleton structure, to apply electrical potentials to conductive power supply paths which in turn feed the electrical devices mounted on the printed circuit boards. The power distribution arrangement consists of a plurality of conductive members, corrugated rings, for instance, having contact portions arranged one-above-the-other on a grooved insulator. The contact portions make contact with power supply paths on the printed circuit boards to apply power from a plurality of power pins, through feed pins to each of the electrical devices mounted on the circuit boards.

The above-mentioned and other features and objects of this invention will become more apparent by reference to the following description taken in conjunction with the accompanying drawings, in which:

FIGURE 1 shows an exploded side view of the major elements of the component packaging arrangement according to this invention;

FIGURE 2*a* shows an end view of the hexagonally shaped female members of FIGURE 1 in which the male plug-in-unit is receivable;

FIGURE 2*b* shows an end view of the hexagonally shaped female members of FIGURE 1 to which electrical energy may be applied or to which transducer devices in accordance with this invention may be applied;

FIGURE 2*c* is an end view of the plug-in-unit of FIGURE 1 which shows the arrangement of the power pins, the ventilating apertures and the positioning of the planar component mounting boards with respect to the skeleton structure center post by means of retention members which are fixedly attached to the skeleton structure center post;

Figure 2C:
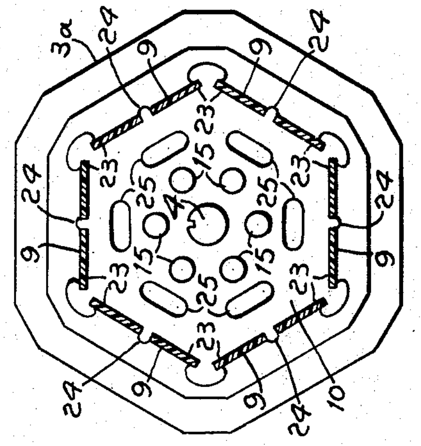
Figure 2B:
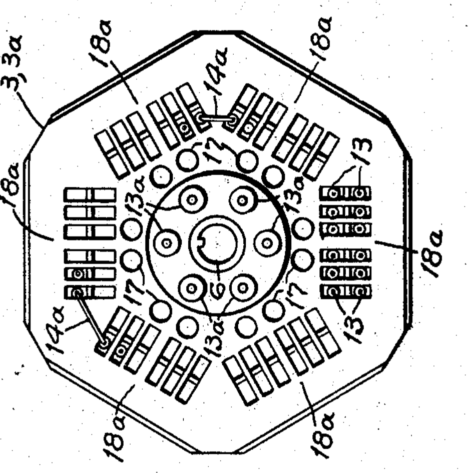
Figure 2A:
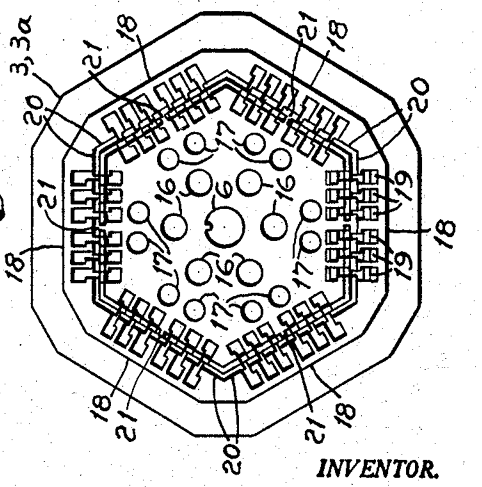
Figures 3, 4, 5, 6, 7:
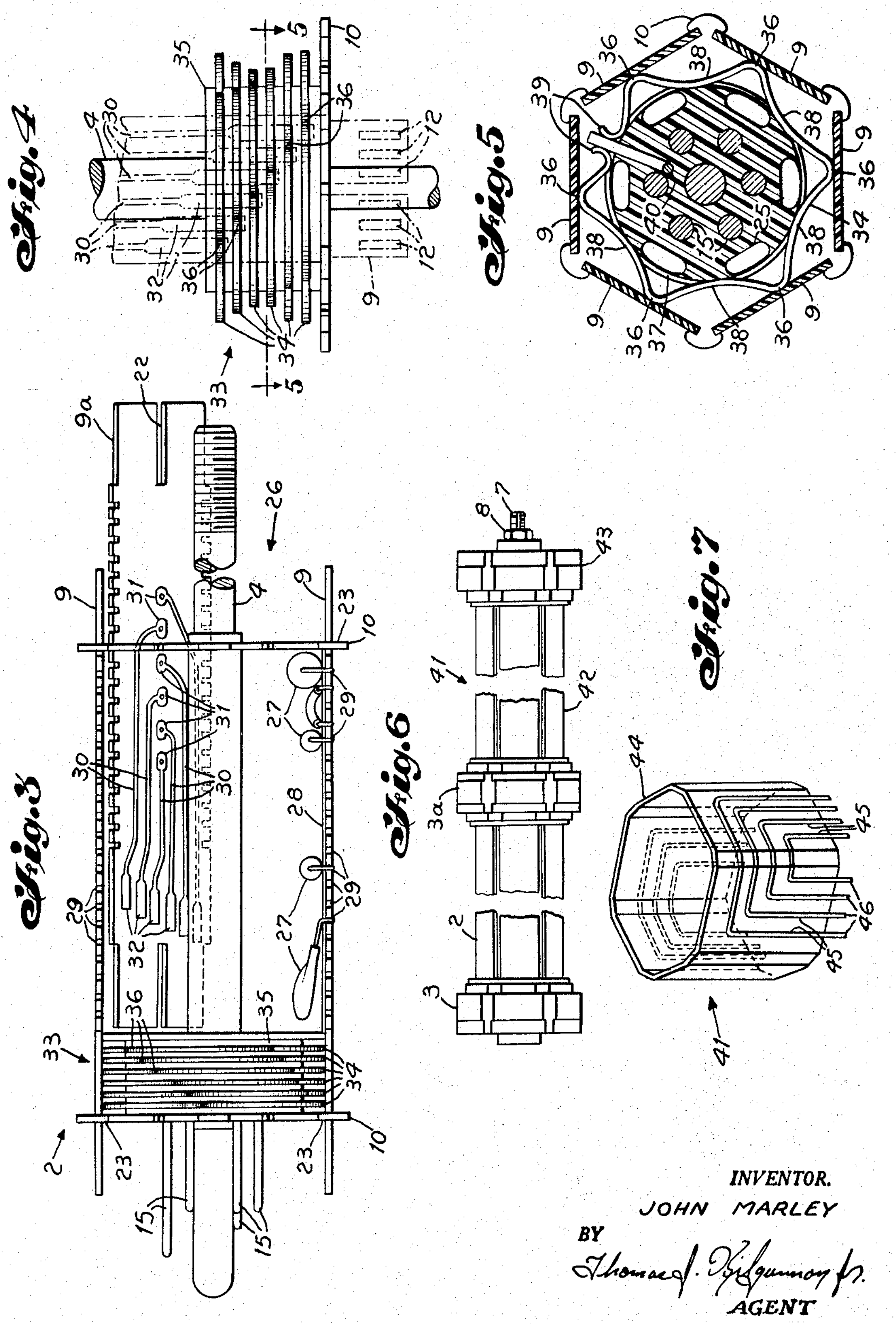
FIGURE 3 is a side view of the plug-in-unit of FIGURE 1 with certain of the planar component mounting elements removed to clearly show the skeleton structure of the plug-in-unit, the arrangement of typical electrical components on the planar elements, the conductive power distribution paths, and the power distribution means which is integral with the skeleton structure adjacent one end thereof.
FIGURE 4 is an enlarged side view of the power distribution means of FIGURE 3 showing the juxtaposition of the contact portions of conductive corrugated rings with the conductive power paths which are disposed on one surface of the planar component mounting elements.
FIGURE 5 is a cross-sectional view taken along lines

5—5 of FIGURE 4 which clearly shows the distribution of an electrical potential from a power pin through a feed pin to the corrugated conductive ring whose contact portions apply the electrical potential to the conductive power paths which are disposed on a surface of the planar component mounting elements;

FIGURE 6 is a side view of the packaging arrangement according to this invention showing a second plug-in-unit inserted pick-a-back fashion in a female member to provide an arrangement which is either redundant or which varies the electrical function of the first packaging arrangement; and FIGURE 7 is an isometric view of a hollow hexagonally-shaped "encoder" having a plurality of conductive paths disposed on the surfaces thereof and having a plurality of male terminals disposed at the extremities of the paths to interconnect various ones of said electrical components and receivable in that portion of the female member as shown in FIGURES 2*a* or 2*b*.

Figure 1:
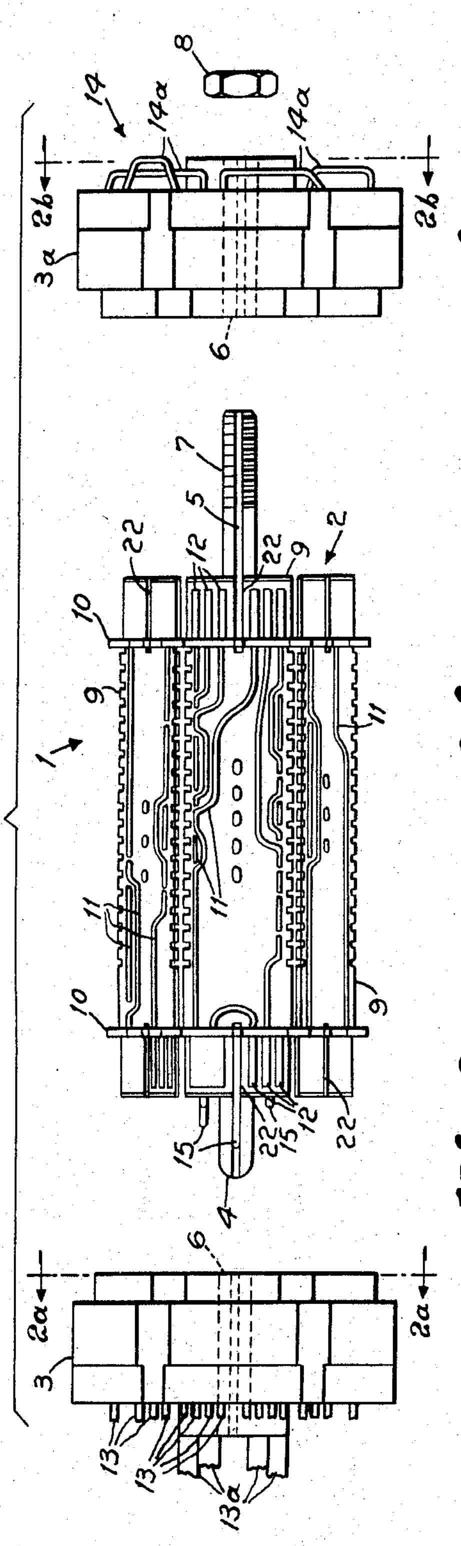

Referring now to FIGURE 1 there is shown generally at 1 an exploded side view of the high density electrical component packaging arrangement according to the present invention. Packaging arrangement 1 consists of a male plug-in-unit 2 and first and second female member units 3 and **3*a* (herein referred to as female members) in which portions of plug-in-unit 2 are receivable. Center post 4 extends lengthwise of packaging arrangement 1, and contains a slot 5 which also extends lengthwise of packaging arrangement 1. The extremities of center post 4 are receivable in keyed center holes 6 which extend lengthwise of female members 3 and 3*a*. A threaded portion 7 of center post 4, when packaging arrangement 1 is assembled, extends through female member 3*a* and nut 8 retains female member 3*a* in fixed relationship with the other portions of plug-in-unit 2**. Other suitable retaining arrangements may, of course, be utilized without departing from the spirit of this invention.

Plug-in-unit 2, as shown in FIGURE 1, consists of mounting and energy distribution means in the form of planar non-conductive elements 9 which are preferably printed circuit boards detachably arranged about center post 4 by means of retaining members 10. Planar elements 9, have a plurality of conductive signal paths 11 disposed on the outwardly facing surfaces thereof which terminate at the extremities of the elements 9 in male terminal portions 12. The extremities of planar elements 9 are receivable in female members 3 and **3*a* and electrical signals are applied to terminal portions 12 in a manner which will become apparent when a detailed discussion of the female members 3 and 3*a* is hereinafter made. While it is not apparent from the side view of packaging arrangement 1 in FIGURE 1, it should be appreciated that similar conductive paths 11 and terminal portions 12 appear on each and every outwardly facing surface of the planar elements 9**.

A plurality of conductors is shown attached to female member 3 at 13 and **13*a*. Conductors 13 supply electrical signals to plug-in-unit 2 and conductors 13*a* supply electrical power to plug-in-unit 2**. The positions of the power and signal (intelligence or information bearing) conductors relative to one another will become clear in connection with the discussion of FIGURES 2*a*, 2*b* and 2*c* which follows hereinafter. An "encoder" arrangement 14 consisting of a plurality of "patching" conductors **14*a* is shown extending from female member 3*a*. The positioning of the "patching" conductors 14*a* encodes or determines the particular electrical function of the component packaging arrangement 1. The arrangement of conductors 14*a*** will also become apparent in connection with a consideration of FIGURE 2*b*. Other encoder arrangements will be discussed later in connection with a consideration of transducers (which include encoders) which vary the function of the packaging arrangement or provide redundancy capabilities for the original plug-in-unit. Finally, in FIGURE 1, a number of power pins 15 are shown disposed adjacent center post 4 and extending from plug-in-unit 2. The relationship of power pins 15 to other elements of packaging arrangement, will become clear in connection with the description of FIGURE 2*c*.

Thus far, nothing has been said regarding the cross-section of the various elements discussed in connection with FIGURE 1. Referring to FIGURES 2*a*, 2*b*, and 2*c*, it can be clearly seen that the cross-sections of the female members 3 and **3*a* and plug-in-unit 2** are polygonal and preferably hexagonal. While our investigations have shown that a body having a hexagonal cross-section is not the optimum as far as obtaining maximum cross-sectional area for a fixed volume, other considerations such as the use of rigid circuit boards, component size, ease of assembly and cooling have indicated that the hexagonal cross-section packaging arrangement provides a maximum cross-sectional area for a given volume if all the objectives of this invention are to be met.

Referring now to FIGURE 2*a*, there is shown an end view of female members 3 and **3*a*, into which portions of plug-in-unit 2 are receivable. Thus, center post 4, with its slot 5 is receivable in keyed hole 6 which extends through female members 3 and 3*a*. It should be appreciated that female members 3 and 3*a* are identical in structure and that when one member is referred to, the other member is included. Female members 3 and 3*a*** are so arranged that the ends shown in FIGURE 2*a* face each other. Thus, power pins 15 are receivable in receptacles 16 which are arranged substantially circularly about keyed hole 6. Apertures 17, grouped symmetrically about keyed hole 6 and at a greater radial distance therefrom than receptacles 16, extend through female members 3 and **3*a* to permit the passage of a coolant such as air, interiorly of packaging arrangement 1. Finally, a plurality of groups of aperture 18 are shown, each of the groups containing a number of female connectors 19 in which the male terminal portions 12 of conductive signal paths 11 are receivable. Female connectors 19 are shown in only one of the groups of apertures 18 for the sake of convenience, but it should be appreciated that all the other groups contain a like arrangement of female connectors 19. Slots 20 are disposed transversely of each of the groups 17 and parallel to an adjacent side of the hexagonally shaped female members 3 and 3*a*. Midway, in each slot 20, is a positioning key 21 which is adapted to mate with a guide slot 22 (see FIGURE 1) in each of the planar mounting elements 9 to maintain the lateral positioning of elements 9 in slots 20. From the foregoing, it may be seen that the plug-in-unit 2 when assembled can be inserted into female member 3, each male portion of plug-in-unit 2; the center post 4, the power pins 15 and the male terminal portions 12, having corresponding female receptacles or connectors, keyed hole 6, receptacles 16 and female connectors 19. In like manner, female member 3*a* has corresponding portions into which threaded portion 7 of center post 4, and male terminal portions 12 of planar element 9** may be inserted.

While no specific embodiments have been shown with respect to power receptacles 16 and female connector 19, any number of appropriate receptacles and connectors which are available in the industry and well known to those skilled in the art may be utilized.

Referring now to FIGURE 2*b*, there is shown an end view of female members 3 and **3*a* to which the signal and power conductors 13 and 13*a*, respectively and "patching" conductors 14*a* respectively are connected. It should be noted that the groups of apertures 18 extend through female members 3 and 3*a*** and appear in FIGURE 2*b* as groups of rectangularly shaped apertures **18*a* into which twin-lead signal conductors 13 may be inserted to make contact within female members 3 and 3*a* with female connectors 19. The absence of slots 20** should be noted in FIGURE 2*b*, because it is important that the signal conductors 13 be isolated one from the other by the walls of apertures **18*a***.

In a similar manner, power conductors **13*a* are connected to power receptacles 16 which mate with power pins 15. It should be appreciated that, while conductors 13 and 13*a* have been shown in only one group of aperture 18*a*, conductor 13 extends from each of the aperture groups 18*a*. Ultimately, power is applied to a plurality of electrical devices which are mounted on planar elements 9. A consideration of FIGURES 3, 4, and 5 will show, among other things, how the desired potentials are applied to such electrical devices. Patching conductors 14*a*, when the female member is in the 3*a* position, may extend between any two or more of the apertures of the groups 18*a* so that the electrical function of packaging arrangement 1 may be varied. In position 3*a*, groups of apertures 18*a* would contain female connectors similar to connectors 19 in which the ends of "patching" conductors 14*a* are receivable. "Patching" conductors 14*a*** have been shown in FIGURE 2*b* along with conductors 13 and **13*a* for the sake of convenience. It is, of course, to be understood that conductors 13 and 13*a* would be associated with female member 3 and "patching" conductors 14*a* would be associated with female member 3*a***.

Referring now to FIGURE 2*c*, there is shown an end view of plug-in-unit 2 of FIGURE 1. Retaining member 10 is a substantially hexagonal wafer-like disc of insulating material having recesses 23 into which planar mounting elements 9 are snap-fitted. A raised portion 24 at the center of each recess 23 engages guide slots 22 in each of planar elements 9 so that axial movement of the planar elements in the recesses 23 is not possible. Retaining member 10 is fixedly attached to center post 4 by any well known means and power pins 15, arranged circularly about post 4 pass through member 10 to make contact with means, hereinafter described, for applying electrical potentials to a number of electrical devices. Retaining member 10 also contains a number of coolant apertures 25 to permit air or the like to pass interiorly of plug-in-unit 2.

Referring now to FIGURE 3, there is shown a side view of plug-in-unit 2 with certain of planar mounting elements 9 removed which clearly shows skeleton structure 26 made of retaining members 10 fixedly attached to center post 4. Planar mounting elements 9 are shown detachably coupled to recesses 23. A plurality of electrical components 27, resistors, capacitors, transistors, etc., are shown mounted on planar mounting elements 9 and insulated from the surface of elements 9 by a strip of insulating tape 28. Standard electrical components compatible with the width of planar elements 9 may be utilized as well as miniaturized integrated circuits which are presently coming into wide use. While printed circuit boards having dimensions of ⅝" x 2¾" x .031" thick have been used and are shown in the accompanying figures, elements which act as substrates upon which electronic components or integrated circuits can be deposited may also be utilized with advantage in the practice of this invention. In the case shown in FIGURE 3, the electronic components 27 have leads which are bent around retaining slots 29 which are disposed along the edges of planar elements 9. Before attaching to skeleton structure 26, the planar elements 9 are masked and dipped soldered to produce the conductive signal paths 11 (see FIGURE 1) which electrically and mechanically couple the leads of components 27 to signal paths 11. Components 27 are only shown in FIGURE 3 on one of the planar elements 9 for the sake of convenience, but it should be appreciated that the components 27 are mounted on the inwardly facing surfaces of all of planar elements 9. In this manner, it is possible to protect components 27 from contact with adjacent plug-in-units with the circuit board itself acting as a protective skin. Utilizing this technique, it is also possible to provide controlled amounts of coolant for optimum heat tranfser characteristics. A very important reason for placing components 27 in the manner shown, takes into consideration the necessity for supplying the proper electrical potentials to various ones of these components. As has already been seen in connection with FIGURE 1, a plurality of conductive signal paths 11 is shown disposed on the outwardly facing surface of planar mounting elements 9. Conductive paths 11 apply electrical signals to components 27 over a path comprising signal conductors 13, female connectors 19 and male terminal portions 12. In like manner, a plurality of conductive power distribution paths 30, shown in FIGURE 3 disposed on the inwardly facing surface of one of the planar elements 9*a* provides for the application of positive, negative or ground potential to various ones of electrical components 27. Conductive paths 30, are printed on a surface of planar elements 9, and each path terminates at one extermity in a plated-through hole 31 so that a given potential may be picked off from either side of planar elements 9. At the other extremity of paths 30, a terminal 32 electrically couples the available potentals from means, shown generally at 33 for applying the potentials to electrical devices 27.

In FIGURE 3, planar mounting element 9*a* is shown laterally displaced from its usual position to show clearly the placement of conductive power paths 30, plated holes 31 and terminals 32.

Means 33 for applying electrical potentials to electrical devices 27 is shown in FIGURE 3 integral with and fixedly connected to skeleton structure 26. Means 33, consists of male power pins 15, already discussed in connection with FIGURE 1, and conductive commutator means 34 electrically and mechanically coupled to pins 15. Commutator means 34 consists of a plurality of conductive members disposed one above the other, concentric with center post 4 and mounted on insulator means 35. A further consideration of FIGURE 3 shows that conductive members 34 contact planar elements 9 at raised contact portions 36 to conduct appropriate potentials to conductive power paths 30 disposed on the inwardly facing surfaces of elements 9. The juxtaposition and cooperation of the various elements may be clearly seen from a consideration of FIGURE 4 and FIGURE 5 as follows.

FIGURE 4 is an enlarged view of means 33 for applying electrical potentials to components 27 and shows insulator 35 connected by any well known means to center post 4 and adjacent retaining member 10. FIGURE 5 is a cross-sectional view taken along lines 5—5 of FIGURE 4, which clearly shows the cooperation between power pins 15 and conductive members 34 to apply electrical potentials to terminals 32 of conductive power paths 30. Conductive members 34 are shown as corrugated rings having raised contact 36 which extend outwardly to contact at least a single conductive power path 30 on each of planar elements 9. Insulator 35 has a plurality of grooves 37 in which inwardly extending portions 38 of corrugated rings 34 are receivable. In FIGURE 5, corrugated ring 34 is shown having extremities 39 which are furled to contact a portion of feed pin 40; the other end of pin 40 being attached to one of said power pins 15. Feed pin 40 extends radially from power pin 15 and intersects one of grooves 37 of insulator 35. It should be understood that a feed pin 40 extends radially from each of power pins 15 and that each feed pin 40 intersects a different groove 37 thereby carrying the potential associated with a particular power pin 15 to corrugated ring 34, the raised contact portions 36 of which apply that potential to terminals 32 of power paths 30. FIGURE 4 shows the staggered arrangement of raised contact portions 36 and terminals 32 so that a different potential may be applied to each of the conductive paths 30 which are disposed on a single planar element 9. It should be noted that insulator 35 has a plurality of coolant apertures 25 which register with the coolant apertures 17 and 25 of FIGURES 2*a*, 2*b* and 2*c* to permit the unrestricted flow of coolant through the interior of plug-in-unit 2. Also in FIGURE 4, the position of the male terminal portions 12 of signal paths 11 is shown relative to the position of terminals 32 of power paths 29 in the transparent view of planar element 9.

Referring to FIGURES 6 and 7, there are shown transducers 41 which include in FIGURE 6, a male plug-in-unit 42 which is in every way similar to plug-in-unit 2 of FIGURE 1 and female member 43 which is similar to female member 3*a* of FIGURE 1, and in FIGURE 7 an "encoder" means 44 which performs a function similar to the "encoder" 14 of FIGURE 1.

The transducer 41 of FIGURE 6 is useful where it is desired to supply circuits to equipment in a redundant fashion. Redundancy techniques usually provide for the presence of second or third circuits which perform the same function as the original circuit of the equipment. The redundant circuits are arranged to operate in a "hot standby" condition, that is, power is applied to the redundant circuit, but no intelligence is transmitted or received until a predetermined threshold is reached by the breakdown or destruction of the initial circuit. In like manner, a third redundant circuit would start to transmit or receive only upon the cessation of operation of a second redundant circuit.

In FIGURE 6, plug-in-units 2 and 42 are shown arranged in pick-a-back fashion. Threaded portion 7 is shown extending from female member 43 with nut 8 engaged therewith to maintain plug-in-units 2 and 42 in a fixed position. By simply inserting plug-in-unit 42 in female member 3*a*, after taking steps, obvious to one skilled in the art, to remove the obstruction presented by the nut 8 and threaded portion 7 of plug-in-unit 2, it is possible to apply signals, initially applied to plug-in-unit 2, to plug-in-unit 42 via female connectors 19 which are disposed in aperture groups 18*a*. It should be apparent that slots 20 should be present on both sides of female member 3*a* so that the extremities of planar elements 9 of plug-in-unit 42 may be introduced therein. The potentials initially placed on plug-in-unit 2 may be carried by suitable conductors internally of unit 2 and applied to power receptacles 16 in female member 3*a* so that power pins of plug-in-unit 42 may also be energized. Plug-in-unit 42, may also be utilized to vary the electrical function of plug-in-unit 2, by adding other components to the original circuits.

In FIGURE 7 "encoder" means 44 is another form of transducers 41. "Encoder" 44 is a hollow hexagonal member of insulating material having a plurality of conductive interconnection paths 45 disposed on the surface thereof. Interconnection paths 45 terminate in male connectors 46 which are adapted to mate with female connectors disposed within the rectangularly shaped apertures 18*a* of FIGURE 2*b*. "Encoder" 44 performs a function similar to the "encoder" 14 and "patching" conductors 14*a* of FIGURE 1; that of interconnecting various ones of electrical components 27 to perform a given electrical function. The conductive paths 45 of "encoder" 44 are printed or deposited on its surface in a fixed relationship, so that all components may be interconnected simultaneously by inserting male connectors 46 in female member 3*a*. An additional advantage accrues by virtue of the use of such encoders. Assume that planar elements 9 have mounted thereon condensers, resistors, inductances, transistors, etc. in a given manner. By utilizing an "encoder" 44 which has appropriate connections 45 on the surface thereof, it is possible to have packaging arrangement 1 perform a given logic function. By then simply replacing "encoder" 44 with another having a different set of interconnections 45, it is possible to have the same elements perform another electrical function. From the foregoing, it is clear that a large number of functions may be performed using a single packaging arrangement 1 and a number of "encoders" 44 with their associated interconnections 45. To further increase the versatility of the packaging arrangement of this invention, electrical components such as resistances, capacitances and even transistors could be included in the interconnection paths 45 of encoder 44.

From all the foregoing, it may be seen that a packaging arrangement 1 of high electrical and mechanical versatility has been provided. In case of gross electrical failures, a plug-in-unit 2 may be replaced by another plug-in-unit or where a failure is capable of being isolated, a single planar mounting element 9 may be replaced. Further, repair of individual components 26 on elements 9 may be accomplished with ease by having testing arrangements which will indicate a failed component by simply plugging-in a planar element 9. The fact that plug-in-units 2 can be repaired by simply snapping in a new circuit board indicates that "down-time" of critical equipment can be minimized. From an economic standpoint, it is also clear that great savings are possible since a planar mounting element 9, if thrown away, represents only about ten percent of the total cost of packaging arrangement 1. In adidtion, packaging arrangement 1 allows high density arrangements of components because coolant can be introduced into areas of maximum heating. The hexagonal shape of packaging arrangement 1, of course, permits the utilization of such arrangements in honeycomb arrays; a plurality of such packaging arrangement forming a complete equipment such as a digital computer. Finally, the use of transducers permits a versatility of function heretofore unobtainable and has brought nearer the day when redundancy techniques will be economically feasible in even the most commonplace equipments.

While I have described above the principles of my invention in connection with specific apparatus, it is to be clearly understood that this description is made only by way of example and not as a limitation to the scope of my invention as set forth in the objects thereof and in the accompanying claims.

I claim:

1. A high density electrical component packaging arrangement comprising:

first and second female member units;

a male plug-in-unit including a skeleton structure having a center post and retaining members fixedly attached thereto and transverse to the longitudinal axis thereof, said plug-in-unit receivable in said female member units;

mounting and energy distribution means for a plurality of electrical devices detachably connected to said skeleton structure, said mounting and distributing means including a plurality of planar non-conductive elements the extremities of which are receivable in said female member units, said planar elements having conductive signal paths disposed on a surface thereof and terminating at the extremities thereof and a plurality of conductive power supply paths disposed on another surface thereof, said signal and power paths being connected to various ones of said electrical devices; and means integral with said skeleton structure for applying electrical potentials to said electrical devices, said means for applying said electrical potentials including a plurality of male power pins disposed substantially circular about said center post and receivable in said first female member unit, and conductive commutator means connected to said power pins, said commutator means comprising a plurality of open-end flexible corrugated ring conductive members disposed one above the other concentric with said center post, and insulator means concentric with and connected to said center post electrically isolating each of said conductive members one from the other.

2. A high density electrical component packaging arrangement according to claim 1 further including a plurality of conductive feed pins, each of said feed pins being connected to a different power pin, said feed pins being disposed within said insulator means one above the other and extending radially from said center post such that a portion of each of said feed pins protrudes from said insulator means.

3. A high density electrical component packaging arrangement according to claim 2 wherein said insulator means comprises a substantially cylindrical body connected and concentric with said center post adjacent one end thereof having a plurality of grooves arranged one above the other about the periphery thereof each of said groove intersecting a feed pin and adapted to receive one of said plurality of conductive members.

4. A high density electrical component packaging arrangement according to claim 3, wherein inwardly extending portions of said ring engage one of said grooves and outwardly extending portions of said ring contact at least a single conductive power path on each of said planar elements, the extremities of said ring being adapted to contact said protruding portion of said feed pin.

5. An arrangement according to claim 1 wherein said retaining member comprise flat polygonal wafers having a recess in each of the sides thereof adapted to receive said mounting and energy distributing means and containing a plurality of apertures to permit the passage of coolant about said electrical devices.

References Cited

UNITED STATES PATENTS

| | | | |
|---|---|---|---|
| 3,265,936 | 8/1966 | Lazar et al. | 317—101 |
| 2,703,853 | 3/1955 | Chrystie | 317—101 |
| 2,892,131 | 6/1959 | MacDonnell | 317—101 |
| 3,242,385 | 3/1966 | Steeneck | 317—101 |

FOREIGN PATENTS

| | | |
|---|---|---|
| 1,284,551 | 1/1962 | France. |

ROBERT K. SCHAEFER, *Primary Examiner.*

W. GARVERT, D. SMITH, Jr., *Assistant Examiners.*